United States Patent
McMahon et al.

(10) Patent No.: US 11,072,140 B2
(45) Date of Patent: Jul. 27, 2021

(54) BALANCED PROCESS FOR EXTRUSION OF PLASTIC CORRUGATED SHEET AND SUBSEQUENT CONVERTING INTO PLASTIC BOXES

(71) Applicant: ORBIS Corporation, Oconomowoc, WI (US)

(72) Inventors: William F. McMahon, Hartford, WI (US); Donald J. Balazs, Oconomowoc, WI (US)

(73) Assignee: ORBIS Corporation, Oconomowoc, WI (US)

( * ) Notice: Subject to any disclaimer, the term of this patent is extended or adjusted under 35 U.S.C. 154(b) by 223 days.

(21) Appl. No.: 16/010,967

(22) Filed: Jun. 18, 2018

(65) Prior Publication Data

US 2018/0362207 A1 Dec. 20, 2018

Related U.S. Application Data

(60) Provisional application No. 62/577,517, filed on Oct. 26, 2017, provisional application No. 62/522,457, filed on Jun. 20, 2017.

(51) Int. Cl.
*B31B 50/00* (2017.01)
*B29C 65/08* (2006.01)
(Continued)

(52) U.S. Cl.
CPC .............. *B31B 50/00* (2017.08); *B29C 48/12* (2019.02); *B29C 65/08* (2013.01); *B29C 65/18* (2013.01);
(Continued)

(58) Field of Classification Search
CPC ......... B31B 50/02; B31B 50/04; B31B 50/10; B31B 50/14; B31B 50/142; B31B 50/252;
(Continued)

(56) References Cited

U.S. PATENT DOCUMENTS

| | | | |
|---|---|---|---|
| 1,101,927 A | 6/1914 | Hawkins et al. | |
| 1,733,566 A | 10/1929 | Weaver | |

(Continued)

FOREIGN PATENT DOCUMENTS

| | | | |
|---|---|---|---|
| CA | 2935978 A1 | 4/2013 | |
| CA | 2961959 A1 | 4/2016 | |

(Continued)

OTHER PUBLICATIONS

The International Bureau of WIPO, International Preliminary Report on Patentability for PCT/US2012/038316, dated Apr. 15, 2014, 9 pages.

(Continued)

*Primary Examiner* — Sameh Tawfik
(74) *Attorney, Agent, or Firm* — Greensfelder, Hemker & Gale, P.C.; Richard C. Himelhoch (57) ABSTRACT

The invention is directed to a balanced process for extrusion of a plastic corrugated sheet or blanks, and subsequent converting of the blanks into plastic boxes. The process includes conveying the blanks to a plurality of forming stations for incrementally forming features on the blank needed for forming a box. The present process is performed at a slower speed than typical paper corrugated forming.

15 Claims, 6 Drawing Sheets

(51) Int. Cl.
  *B65D 5/20* (2006.01)
  *B65D 5/468* (2006.01)
  *B29C 65/38* (2006.01)
  *B29C 48/12* (2019.01)
  *B29C 65/00* (2006.01)
  *B29C 65/18* (2006.01)
  *B29C 65/74* (2006.01)
  *B29C 65/78* (2006.01)
  *B31B 50/14* (2017.01)
  *B31B 50/25* (2017.01)
  *B31B 50/02* (2017.01)
  *B65D 5/42* (2006.01)
  *B29L 16/00* (2006.01)
  *B29L 7/00* (2006.01)
  *B29C 48/00* (2019.01)
  *B29C 48/07* (2019.01)
  *B31B 100/00* (2017.01)
  *B31B 50/64* (2017.01)
  *B31B 120/70* (2017.01)
  *B31B 50/04* (2017.01)
  *B31B 50/10* (2017.01)

(52) U.S. Cl.
  CPC .......... *B29C 65/38* (2013.01); *B29C 65/7441* (2013.01); *B29C 65/7443* (2013.01); *B29C 65/7891* (2013.01); *B29C 66/1122* (2013.01); *B29C 66/431* (2013.01); *B29C 66/72523* (2013.01); *B29C 66/73921* (2013.01); *B29C 66/81417* (2013.01); *B29C 66/8322* (2013.01); *B31B 50/02* (2017.08); *B31B 50/14* (2017.08); *B31B 50/142* (2017.08); *B31B 50/25* (2017.08); *B65D 5/2076* (2013.01); *B65D 5/4608* (2013.01); *B29C 48/001* (2019.02); *B29C 48/0011* (2019.02); *B29C 48/0022* (2019.02); *B29C 48/07* (2019.02); *B29C 65/083* (2013.01); *B29C 65/7894* (2013.01); *B29C 66/83413* (2013.01); *B29L 2007/002* (2013.01); *B29L 2016/00* (2013.01); *B31B 50/04* (2017.08); *B31B 50/10* (2017.08); *B31B 50/252* (2017.08); *B31B 50/64* (2017.08); *B31B 2100/00* (2017.08); *B31B 2120/70* (2017.08); *B65D 5/4266* (2013.01); *B65D 2301/20* (2013.01)

(58) Field of Classification Search
  CPC ......... B31B 50/64; B31B 50/00; B31B 50/25; B31B 2100/00; B31B 2120/70; B65D 5/4266; B29C 48/12; B29C 65/08; B29C 68/18; B29C 65/38
  USPC .......................... 493/51, 54, 55, 56, 59, 182
  See application file for complete search history.

(56) References Cited

U.S. PATENT DOCUMENTS

| | | |
|---|---|---|
| 2,533,773 A | 12/1950 | De La Foret |
| 2,751,136 A | 6/1956 | Moore |
| 3,199,763 A | 8/1965 | Anderson |
| 3,203,288 A | 8/1965 | Blumer |
| 3,349,446 A | 10/1967 | Haygeman |
| 3,406,052 A | 10/1968 | Peters |
| 3,414,184 A | 12/1968 | Loheed |
| 3,562,041 A | 2/1971 | Robertson |
| 3,611,884 A * | 10/1971 | Hottendorf ............ B31F 1/10 493/55 |
| 3,687,170 A | 8/1972 | Malone et al. |
| 3,727,825 A | 4/1973 | Troth |
| 3,727,826 A | 4/1973 | Shepherd |
| 3,768,724 A | 10/1973 | Hill |
| 3,796,307 A | 3/1974 | McKinney |
| 3,883,065 A | 5/1975 | Presnick |
| 3,884,132 A | 5/1975 | Snodgrass |
| 3,907,193 A | 9/1975 | Heller |
| 3,929,536 A | 12/1975 | Maughan |
| 3,973,721 A | 8/1976 | Nakane |
| 3,977,310 A | 8/1976 | Keck et al. |
| 3,981,213 A | 9/1976 | Lopman |
| 4,011,798 A | 3/1977 | Bambara et al. |
| 4,027,058 A | 5/1977 | Wootten |
| 4,090,903 A | 5/1978 | Matsui |
| 4,106,623 A | 8/1978 | Carroll et al. |
| 4,121,754 A | 10/1978 | Hackenberg |
| 4,239,150 A | 12/1980 | Schadowski et al. |
| 4,267,223 A | 5/1981 | Swartz |
| 4,313,547 A | 2/1982 | Osborne |
| 4,348,449 A | 9/1982 | Seufert |
| 4,356,053 A | 10/1982 | LoMaglio |
| 4,358,498 A * | 11/1982 | Chavannes ........... B29C 70/202 428/108 |
| 4,415,515 A | 11/1983 | Rosenberg |
| 4,441,948 A | 4/1984 | Gillard et al. |
| 4,477,013 A | 10/1984 | Herrin |
| 4,477,522 A | 10/1984 | Sheehan |
| 4,482,417 A | 11/1984 | Hulber et al. |
| 4,507,348 A | 3/1985 | Nagata et al. |
| 4,515,648 A | 5/1985 | Kolbe et al. |
| 4,517,790 A | 5/1985 | Kreager |
| 4,535,929 A | 8/1985 | Sherman, II et al. |
| 4,559,259 A | 12/1985 | Cetrelli |
| 4,596,541 A | 6/1986 | Ward, Sr. et al. |
| 4,601,407 A | 7/1986 | Gillard |
| 4,604,083 A * | 8/1986 | Barny ..................... B31B 50/00 493/28 |
| 4,605,454 A | 8/1986 | Sayovitz et al. |
| 4,655,389 A | 4/1987 | Marsh |
| 4,767,393 A | 8/1988 | Smith |
| 4,784,269 A | 11/1988 | Griffith |
| 4,865,201 A | 9/1989 | Liebel |
| 4,906,510 A | 3/1990 | Todor, Jr. et al. |
| 4,938,413 A | 7/1990 | Wolfe |
| 4,946,430 A | 8/1990 | Kohmann |
| 4,948,039 A | 8/1990 | Amatangelo |
| 4,960,207 A | 10/1990 | Tabler et al. |
| 5,012,930 A | 5/1991 | Hansen |
| 5,021,042 A | 6/1991 | Resnick et al. |
| 5,054,265 A | 10/1991 | Perigo et al. |
| 5,114,034 A | 5/1992 | Miller et al. |
| 5,158,525 A | 10/1992 | Nikkel |
| 5,163,609 A | 11/1992 | Muise, Jr. |
| 5,183,672 A | 2/1993 | Fetterhoff et al. |
| 5,190,213 A | 3/1993 | Horwitz |
| 5,202,065 A | 4/1993 | Lenander et al. |
| 5,232,149 A | 8/1993 | Stoll |
| 5,255,842 A | 10/1993 | Rosen |
| 5,268,138 A | 12/1993 | Fetterhoff et al. |
| 5,304,056 A | 4/1994 | Fetterhoff |
| 5,340,632 A | 8/1994 | Chappuis |
| 5,351,846 A | 10/1994 | Carter |
| 5,356,696 A | 10/1994 | Fetterhoff |
| 5,384,002 A | 1/1995 | Leatherman et al. |
| 5,466,211 A | 11/1995 | Komarek et al. |
| 5,497,939 A | 3/1996 | Heiskell et al. |
| 5,501,758 A | 3/1996 | Nitardy |
| 5,503,324 A | 4/1996 | Bacchetti et al. |
| 5,533,956 A | 7/1996 | Komarek et al. |
| 5,564,623 A | 10/1996 | Kiley |
| 5,597,111 A | 1/1997 | Mackinnon et al. |
| 5,658,644 A | 8/1997 | Ho et al. |
| 5,681,422 A | 10/1997 | Marschke |
| 5,733,411 A | 3/1998 | Bett |
| 5,765,688 A | 6/1998 | Bertram et al. |
| 5,873,807 A | 2/1999 | Lauderbaugh et al. |
| 5,881,902 A | 3/1999 | Ackermann |
| 5,887,782 A | 3/1999 | Mueller |
| 5,908,135 A | 6/1999 | Bradford et al. |
| 5,913,766 A | 6/1999 | Reed et al. |
| 5,924,627 A | 7/1999 | Wilder et al. |

(56) References Cited

U.S. PATENT DOCUMENTS

| | | | |
|---|---|---|---|
| 5,965,238 A | 10/1999 | Saitoh et al. | |
| 6,007,470 A | 12/1999 | Komarek et al. | |
| 6,039,101 A | 3/2000 | MacKinnon | |
| 6,056,840 A | 5/2000 | Mills et al. | |
| 6,071,225 A | 6/2000 | Kucharski | |
| 6,102,279 A | 8/2000 | Dowd | |
| 6,102,280 A | 8/2000 | Dowd | |
| 6,120,629 A | 9/2000 | Shannon et al. | |
| 6,138,903 A | 10/2000 | Baker | |
| 6,159,137 A | 12/2000 | Lee et al. | |
| 6,203,482 B1 | 3/2001 | Sandford | |
| 6,228,234 B1 | 5/2001 | Oshima et al. | |
| 6,257,484 B1* | 7/2001 | Dowd | B65D 5/10 |
| | | | 229/117.16 |
| 6,338,234 B1 | 1/2002 | Muise et al. | |
| 6,349,876 B1 | 2/2002 | Dowd | |
| 6,450,398 B1 | 9/2002 | Muise et al. | |
| 6,572,519 B1 | 6/2003 | Harris | |
| 6,578,759 B1 | 6/2003 | Ortiz | |
| 6,592,711 B1* | 7/2003 | Kubik | B06B 3/00 |
| | | | 156/379.6 |
| 6,655,434 B2 | 12/2003 | Danko | |
| 6,676,010 B1 | 1/2004 | Roseth et al. | |
| 6,689,033 B2 | 2/2004 | Plemons et al. | |
| 6,705,515 B2 | 3/2004 | Dowd | |
| 6,719,191 B1 | 4/2004 | Christensen et al. | |
| 6,759,114 B2 | 7/2004 | Wu et al. | |
| 6,761,307 B2 | 7/2004 | Matsuoka | |
| 6,769,548 B2 | 8/2004 | Morell et al. | |
| 6,902,103 B2 | 6/2005 | Machery | |
| 6,926,192 B1 | 8/2005 | Dowd | |
| 6,938,818 B2 | 9/2005 | Moorman et al. | |
| 6,994,662 B2* | 2/2006 | Jornborn | B26D 7/2614 |
| | | | 493/56 |
| 7,025,841 B2 | 4/2006 | Owen | |
| 7,028,834 B2 | 4/2006 | Karpel | |
| 7,069,856 B2 | 7/2006 | Hartka et al. | |
| 7,326,168 B2* | 2/2008 | Kocherga | B31F 1/08 |
| | | | 493/150 |
| 7,384,497 B2 | 6/2008 | Christensen et al. | |
| D608,634 S | 1/2010 | Riedi | |
| 7,640,662 B2 | 1/2010 | Haglid | |
| 7,670,275 B2 | 3/2010 | Schaack | |
| 7,682,300 B2 | 3/2010 | Graham et al. | |
| 7,726,480 B2 | 6/2010 | Nazari | |
| 7,870,992 B2 | 1/2011 | Schille et al. | |
| 7,886,503 B2 | 2/2011 | Chase et al. | |
| 7,951,252 B2 | 5/2011 | Danko | |
| 8,418,912 B1 | 4/2013 | Goodrich | |
| 8,662,133 B2 | 3/2014 | Ninomiya et al. | |
| 8,662,378 B2 | 3/2014 | Mehta | |
| 8,864,017 B2 | 10/2014 | McMahon | |
| 9,126,711 B2 | 9/2015 | Hermosillo et al. | |
| 9,302,806 B2 | 4/2016 | Perkins | |
| 9,555,918 B2 | 1/2017 | McMahon | |
| 9,604,750 B2 | 3/2017 | McMahon et al. | |
| 9,630,739 B2 | 4/2017 | McMahon et al. | |
| 10,199,811 B2* | 2/2019 | Chu | B29C 48/0022 |
| 10,392,153 B2 | 8/2019 | Mehta | |
| 10,625,916 B2* | 4/2020 | Balazs | B29C 70/202 |
| | | | 428/108 |
| 2001/0022211 A1 | 9/2001 | Walsh | |
| 2001/0027992 A1 | 10/2001 | Strong | |
| 2001/0046584 A1 | 11/2001 | Danko | |
| 2002/0007607 A1 | 1/2002 | Matlack et al. | |
| 2002/0011513 A1 | 1/2002 | Dowd | |
| 2002/0026742 A1 | 3/2002 | Washington | |
| 2002/0125594 A1 | 9/2002 | Sung et al. | |
| 2003/0010817 A1 | 1/2003 | Lingle et al. | |
| 2003/0102361 A1 | 6/2003 | Terashima et al. | |
| 2003/0127773 A1 | 7/2003 | Feistel et al. | |
| 2003/0215613 A1 | 11/2003 | Jan et al. | |
| 2003/0235660 A1 | 12/2003 | Blanchard | |
| 2004/0222542 A1 | 11/2004 | Jan et al. | |
| 2004/0248717 A1 | 12/2004 | Calugi | |
| 2005/0006446 A1 | 1/2005 | Stafford, Jr. | |
| 2005/0067084 A1 | 3/2005 | Kagan et al. | |
| 2005/0067477 A1 | 3/2005 | McClure | |
| 2005/0150244 A1 | 7/2005 | Hillmann et al. | |
| 2005/0202215 A1 | 9/2005 | Temple, II et al. | |
| 2005/0209076 A1 | 9/2005 | Boutron et al. | |
| 2006/0089071 A1 | 4/2006 | Leidig et al. | |
| 2006/0169757 A1 | 8/2006 | McDowell | |
| 2007/0069428 A1* | 3/2007 | Pfaff | B31F 1/10 |
| | | | 264/442 |
| 2007/0228129 A1 | 10/2007 | Habeger, Jr. et al. | |
| 2007/0241900 A1 | 10/2007 | Sasazaki | |
| 2007/0296890 A1 | 12/2007 | Mizushima et al. | |
| 2008/0003869 A1 | 1/2008 | Wu et al. | |
| 2008/0003870 A1 | 1/2008 | Wu et al. | |
| 2008/0247682 A1 | 10/2008 | Murray | |
| 2009/0011173 A1 | 1/2009 | Thiagarajan | |
| 2009/0280973 A1 | 11/2009 | Graham et al. | |
| 2010/0078466 A1 | 4/2010 | Stack, Jr. et al. | |
| 2010/0105534 A1 | 4/2010 | Nazari | |
| 2010/0147840 A1 | 6/2010 | Dowd | |
| 2011/0069911 A1 | 3/2011 | Ackerman et al. | |
| 2011/0101081 A1 | 5/2011 | Dowd et al. | |
| 2011/0303740 A1 | 12/2011 | Schuld | |
| 2012/0118880 A1 | 5/2012 | Wnek | |
| 2013/0048704 A1* | 2/2013 | Lewis | B65D 5/0015 |
| | | | 229/190 |
| 2013/0055407 A1 | 2/2013 | Hirayama et al. | |
| 2013/0092726 A1 | 4/2013 | McMahon | |
| 2014/0231496 A1 | 8/2014 | McMahon | |
| 2014/0231497 A1 | 8/2014 | McMahon | |
| 2014/0367458 A1 | 12/2014 | Smith | |
| 2014/0367459 A1* | 12/2014 | Smith | B65D 5/4608 |
| | | | 229/122.32 |
| 2014/0374303 A1 | 12/2014 | Martinez | |
| 2015/0174849 A1 | 6/2015 | McMahon et al. | |
| 2015/0174850 A1 | 6/2015 | McMahon et al. | |
| 2015/0175297 A1 | 6/2015 | McMahon et al. | |
| 2015/0175298 A1* | 6/2015 | McMahon | B65D 11/24 |
| | | | 229/182 |
| 2015/0210421 A1 | 7/2015 | Whittles et al. | |
| 2016/0096651 A1 | 4/2016 | Klein | |
| 2016/0102196 A1 | 4/2016 | Dodd | |
| 2017/0066214 A1* | 3/2017 | Polikov | B31B 50/56 |
| 2017/0291731 A1 | 10/2017 | Balazs et al. | |
| 2017/0369221 A1 | 12/2017 | Balazs | |
| 2018/0105316 A1 | 4/2018 | McMahon et al. | |
| 2018/0362207 A1 | 12/2018 | McMahon et al. | |
| 2019/0270542 A1 | 9/2019 | McMahon | |
| 2019/0300210 A1* | 10/2019 | Ponti | B65D 5/443 |

FOREIGN PATENT DOCUMENTS

| | | |
|---|---|---|
| CA | 2851357 C | 8/2016 |
| CA | 3028971 A1 | 12/2017 |
| DE | 911097 U1 | 11/1991 |
| DE | 102010041663 A1 | 3/2012 |
| EP | 0054856 A1 | 6/1982 |
| EP | 0330228 A2 | 8/1989 |
| EP | 0330228 A3 | 8/1989 |
| EP | 0399657 A1 | 11/1990 |
| EP | 0459672 A1 | 12/1991 |
| EP | 0535998 A1 | 4/1993 |
| EP | 0566338 A1 | 10/1993 |
| EP | 0731233 A1 | 9/1996 |
| EP | 1488912 A1 | 12/2004 |
| EP | 1880947 A2 | 1/2008 |
| EP | 1787801 B1 | 8/2009 |
| EP | 1799432 B1 | 1/2010 |
| EP | 2766269 | 8/2014 |
| EP | 2766269 B1 | 12/2016 |
| EP | 3170759 A1 | 5/2017 |
| EP | 3170760 A1 | 5/2017 |
| EP | 3089917 B1 | 6/2018 |
| EP | 3486188 A1 | 5/2019 |
| GB | 1593730 A | 7/1981 |
| GB | 2199017 A | 6/1988 |

(56) References Cited

FOREIGN PATENT DOCUMENTS

| | | |
|---|---|---|
| GB | 2249520 A | 5/1992 |
| GB | 2271095 A | 4/1994 |
| GB | 2276120 A | 9/1994 |
| GB | 2299048 A | 9/1996 |
| JP | S597014 A | 1/1984 |
| JP | 3266630 A | 11/1991 |
| JP | 5146996 A | 6/1993 |
| JP | 08-085148 A | 4/1996 |
| JP | 2003340936 A | 5/2002 |
| JP | 2003062917 A | 3/2003 |
| JP | 2003104361 | 4/2003 |
| JP | 2005343554 A | 12/2005 |
| JP | 2006001136 A | 1/2006 |
| JP | 2009006556 A | 1/2009 |
| KR | 20020006235 A | 1/2002 |
| KR | 20100137130 A | 12/2010 |
| KR | 10-2016-0054489 | 5/2016 |
| MX | 9503047 A | 2/1997 |
| MX | 343734 B | 11/2016 |
| MX | 2017004472 A | 6/2017 |
| MX | 353612 B | 1/2018 |
| MX | 364678 B | 5/2019 |
| TW | 356126 | 4/1999 |
| TW | 416925 B | 1/2001 |
| TW | 200619094 | 6/2006 |
| TW | 306060 B | 2/2009 |
| TW | 201345796 A | 11/2013 |
| TW | I555683 B | 11/2016 |
| TW | 201716293 A | 5/2017 |
| TW | 201716294 A | 5/2017 |
| TW | I600591 B | 10/2017 |
| TW | I600592 B | 10/2017 |
| WO | 9309032 A1 | 5/1993 |
| WO | 2005120965 A1 | 12/2005 |
| WO | 2006034502 A1 | 3/2006 |
| WO | 2007105964 A1 | 9/2009 |
| WO | 2010049880 A2 | 5/2010 |
| WO | 2012055429 A1 | 5/2012 |
| WO | 2013055407 A1 | 4/2013 |
| WO | 2015100249 A2 | 7/2015 |
| WO | 2016057256 A1 | 4/2016 |
| WO | 2017223392 A1 | 12/2017 |
| WO | 2018156604 A1 | 8/2018 |
| WO | 2018236801 A1 | 12/2018 |

OTHER PUBLICATIONS

European Patent Office, Extended European Search Report for EP 18174415.2, dated Mar. 26, 2019, 7 pages.
European Patent Office, International Search Report for PCT/US2012/038316, dated Aug. 2, 2012, 5 pages.
European Patent Office, Extended European Search Report for EP 15849285.0, dated Feb. 7, 2018, 8 pages.
European Patent Office, Written Opinion of International Searching Authority for PCT/US2012/038316, dated Aug. 2, 2012, 8 pages.
Tri-Pack Plastics Ltd.; Web pages for "Chilled Foods," "Polypropylene Packaging," "Tree Tubes," "Transit Packaging," and "Returnable Post"; retrieved Jan. 18, 2010 from <http://www.tri-pack.co.uk/> and related sites, 9 pages.
Wikipedia article: "Corrugated Fiberboard"; retrieved from <http://en.wikipedia.org/w/index.php?title=Corrugated_fiberboard&oldid=648589914> on Mar. 3, 2015, 7 pages.
European Patent Office, Partial International Search Report for PCT/US2014/071926 dated Apr. 28, 2015, 5 pages.
European Patent Office, International Search Report for PCT/US2014/071926 dated Jun. 30, 2015, 6 pages.
Taiwanese Patent Office, Search Report for Taiwanese Application No. 101137741, dated Jun. 23, 2016, 1 page, with English translation.
European Patent Office, Extended European Search Report for EP 16204731.0, dated Feb. 3, 2017, 9 pages.
European Patent Office, Extended European Search Report for EP 16204728.6, dated Feb. 3, 2017, 10 pages.
Taiwanese Intellectual Property Office, Office Action and Search Report for TW Application No. 105123775, dated Mar. 8, 2017, with English translation, 5 pages.
Taiwanese Intellectual Property Office, Office Action and Search Report for TW Application No. 105123777, dated Mar. 8, 2017, with English translation, 5 pages.
European Patent Office, Written Opinion of the International Searching Authority for PCT/US2014/071926, dated Jun. 30, 2015, 6 pages.
The International Bureau of WIPO, International Preliminary Report on Patentability for PCT/US2014/071926, dated Jun. 28, 2016, 7 pages.
The International Bureau of WIPO, International Preliminary Report on Patentability for PCT/US2015/052618, dated Apr. 11, 2017, 5 pages.
Russia's Federal Institute of Industrial Property, Written Opinion of the International Searching Authority for PCT/US2015/052618, dated Feb. 18, 2016, 4 pages.
Russia's Federal Institute of Industrial Property, International Search Report for PCT/US2015/052618, dated Feb. 18, 2016, 2 pages.
European Patent Office; Communication Pursuant to Article 94(3) EPC for EP 14825566.4, dated Dec. 12, 2017, 5 pages.
Taiwanese Intellectual Property Office, Office Action and Search Report for TW Application No. 104132707, dated Jan. 24, 2019, with English translation, 9 pages.
Korean Intellectual Property Office, International Search Report for PCT/US2017/038912, dated Oct. 27, 2017, 3 pages.
Korean Intellectual Property Office, Written Opinion of the International Searching Authority for PCT/US2017/038912, dated Oct. 27, 2017, 9 pages.
The International Bureau of WIPO, International Preliminary Report on Patentability for PCT/US2017/038912, dated Dec. 25, 2018, 10 pages.
Korean Intellectual Property Office, International Search Report for PCT/US2018/018983, dated Jun. 21, 2018, 5 pages.
Korean Intellectual Property Office, Written Opinion of the International Searching Authority for PCT/US2018/018983, dated Jun. 21, 2018, 8 pages.
Korean Intellectual Property Office, International Search Report for PCT/US2018/038182, dated Oct. 17, 2018, 3 pages.
Korean Intellectual Property Office, Written Opinion of the International Searching Authority for PCT/US2018/038182, dated Oct. 17, 2018, 6 pages.
European Patent Office, Extended European Search Report for EP 17816258.2, dated Oct. 18, 2019, 12 pages.
European Patent Office, Communication pursuant to Article 94(3) EPC for EP 15849285.0, dated Nov. 18, 2019, 6 pages.
European Patent Office, Communication pursuant to Article 94(3) EPC for European Application No. 17816258.2, Jul. 24, 2020, 5 pages.
European Patent Office; Communication pursuant to Rule 164(1) EPC, Partial Supplementary European Search Report for European Application No. 18821166.8; dated Feb. 23, 2021; 12 pages.

* cited by examiner

BALANCED PROCESS FOR EXTRUSION OF PLASTIC CORRUGATED SHEET AND SUBSEQUENT CONVERTING INTO PLASTIC BOXES

CROSS-REFERENCE TO RELATED APPLICATIONS

The present invention claims the benefit of U.S. Provisional Patent Application No. 62/522,457 filed Jun. 20, 2017, and U.S. Provisional Patent Application No. 62/577,517 filed Oct. 26, 2017, the contents of which are incorporated herein by reference.

FEDERALLY SPONSORED RESEARCH OR DEVELOPMENT

N/A

FIELD OF THE INVENTION

The present invention is directed toward a balanced process for the extrusion of plastic corrugated sheet and converting the sheet into plastic boxes.

DESCRIPTION OF THE PRIOR ART

Typical processing of corrugated boxes includes cutting blanks to size; printing (if necessary); die cutting the sized blanks; and folding and gluing the die cut blanks into a completed box assembly. Printing of box blanks can be done using a variety of processes and equipment. The most common are silk screen, flexographic, and digital printing. Flexographic printing is far and away the most commonly used method for printing of secondary packaging and shippers. Rotary equipment that print and die cut/score blanks is the most cost effective method when high end graphics are not required. Through put speeds with corrugated are in excess of 10,000-12,000 per hour. Through put speeds in a flexographic print, and rotary die cut machine are in excess of 6,000-12,000 per hour.

Die cutting technology and equipment has been developed and refined for the production of paper corrugated boxes for over 100 years. Flatbed die cutting machines, with a straight up down cutting motion, provide the most precise and consistent die cut and scored blanks in both paper corrugated and plastic corrugated. Through put of top end flatbed die cut machines is in excess of 7000 per hour when converting paper corrugated; slightly less for plastic corrugated. Flat Bed die cutters produce the best quality and most consistent boxes when compared to other die cutting processes.

Rotary Die cutting machines are the fastest commonly use machines to die cut and score blanks into boxes. Rotary machines typically combine printing and die cutting into a single machine so that both operations are completed in a single process step. The cutting and scoring of the blanks in these machines is done as the blanks are moved between two rotating cylinders: one with a cutting and scoring rule, and the other an anvil to cut into and compression score against. Rotary die cutting produces good quality paper corrugated boxes that will typically be a few cents per box less than boxes cut on a flat bed. This few cents per box can be important for large companies that purchase millions and millions of single use corrugated boxes per year. The few cents per box lower cost is less important for multiple use plastic corrugated boxes.

Additional converting machinery is used to form the box once the blank is formed. Folder Gluer machines take paper corrugated or plastic corrugated die cut and scored blanks and fold and glue them into a completed box.

The conventional approach of using converting equipment designed for paper corrugated to convert plastic corrugated results in an overall production process that is out of balance. In very simplified terms, the extrusion of plastic corrugated blanks is very slow and the equipment to convert blanks into boxes is very, very fast.

Using state of the art technology, a plastic corrugated extrusion and edge seal line can produce 40,000-60,000 blanks per week running 24 hours per day and seven days per week. A full week of production running 24/7 on a plastic corrugated extrusion line can be converted in less than one 8 hour shift using conventional paper corrugated converting equipment. The plastic corrugated box blanks produced by three state of the art extrusion/edge sealing lines running 24/7 could be converted into boxes in one day using conventional paper corrugated converting equipment.

However, the speed and size of conventional converting equipment and processes comes at a price. Such equipment and processes cannot consistently be utilized to convert plastic corrugated sheet.

The present invention provides an improved process for forming plastic corrugated material.

SUMMARY OF THE INVENTION

The present invention is directed to a process for forming plastic corrugated boxes in a plurality of steps at separate stations in an in-line system.

In accordance with one aspect of the invention, a balanced in-line process for forming blanks that can be used for forming boxes is provided. The process comprises sequencing a blank of corrugated plastic material having a first outer layer, a second outer layer and a plurality of flutes between the first outer layer and the second outer layer through a plurality of forming stations. This can be accomplished on a conveyor that moves the blank through each of the forming stations. The process includes forming a first body fold line separating a first box side wall and a second box side wall in the blank at a first forming station. Additionally, other body fold lines can be formed at this station as well. The process also includes forming a score line to create a first flap in the blank at a second forming station. Again, other score lines can be formed at this time for additional flaps.

The process can also include the steps of forming a first slot between the first flap and a second flap in the blank at a third forming station (or between additional flaps), and sealing the edges of the first slot. The process can further include forming a glue tab (or manufacturer's joint) at one end of the blank at a fourth forming station and cutting a hand hold into the blank at a fifth forming station.

The fold lines can be formed by joining the first outer layer of the blank to the second outer layer of the blank at each fold line. The score lines can be similarly formed.

The step of joining the first outer layer of the blank to the second outer layer of the blank can comprise contacting the blank with a die rule and a heated plate to weld the first outer layer to the second outer layer at the first fold line. Alternatively, this joining step can comprise contacting the blank with an ultrasonic emitter, which can be part of a plunge ultrasonic system or a rotary ultrasonic system. Further, the joining step can be contacting the blank with an impulse welding device.

The step of forming a glue tab at one end of the blank at a fourth forming station can comprise cutting the end of the blank to form a tab and joining the first outer layer of the tab to the second outer layer of the tab. Again, the joining can utilize a rule and heated plate, ultrasonics or an impulse welding device.

The process can include other steps preformed at other forming stations. For example, the process can include forming smooth sealed edges on the blank, adding latch and hook material to a portion of the blank, and/or printing one or both surfaces of the blank.

Typical operating speeds for forming paper corrugated material are 2500-4500 blanks per hour. At this rate, there is not enough time to transfer heat from a heated plate to the plastic layers in a plastic corrugated material. Accordingly, the process is preferably run at a slower rate, for example, the blanks can be processed at a speed of approximately 325-450 blanks per hour. This slower rate provides more dwell time for transferring heat.

In accordance with another aspect of the invention, a balanced in-line process for forming a plurality of blanks on a conveyor system is provided. The process comprises sequencing a plurality of blanks of corrugated plastic material through a plurality of forming stations by a conveyor. Each blank has a first outer layer, a second outer layer and a plurality of flutes between the first outer layer and the second outer layer and can be initially formed in an extruder device. The process includes moving each of the plurality of blanks through a first forming station by the conveyor and forming a plurality of fold lines in each blank by joining the first outer layer to the second outer layer at each fold line at the first forming station. The process also includes moving each of the plurality of blanks through a second forming station by the conveyor and forming a plurality of flap score lines in each blank by joining the first outer layer to the second outer layer at each score line at the second forming station.

The process can further include moving each of the plurality of blanks through a third forming station by the conveyor and forming slots between flaps in each blank at the third forming station. The process can also include sealing edges of the slots formed in each blank.

The process can also include moving each of the plurality of blanks through a third (or fourth) forming station by the conveyor and forming a glue tab at an end of each blank by joining the first outer layer to the second outer layer at the glue tab. The joining step can be accomplished by contacting each blank with a die rule and a heated plate to weld the first outer layer to the second outer layer at the fold lines. Alternatively, the joining can be accomplished by ultrasonics or impulse welding.

Further aspects of the invention are discussed herein and are shown in the Figures.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The conventional approach of using box converting equipment designed for paper corrugated material, to convert plastic corrugated material, results in an overall production process that is out of balance. In very simplified terms, the extrusion of plastic corrugated blanks is very slow and the conventional equipment to convert paper corrugated blanks into boxes is very, very fast.

Figure 7:
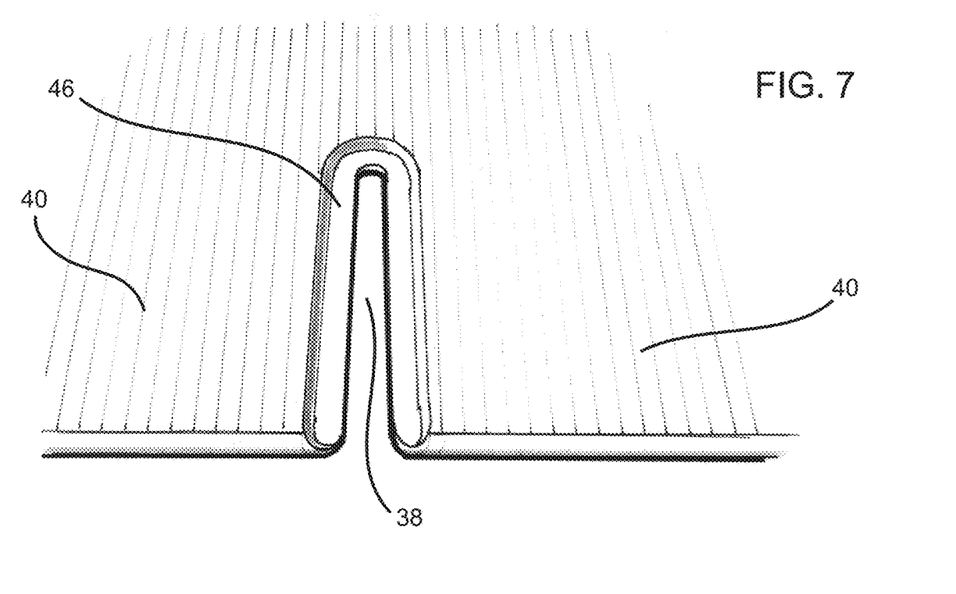
FIG. 7 is partial perspective view of a plastic corrugated blank showing a slot between two flaps of the blank.
Figure 8:
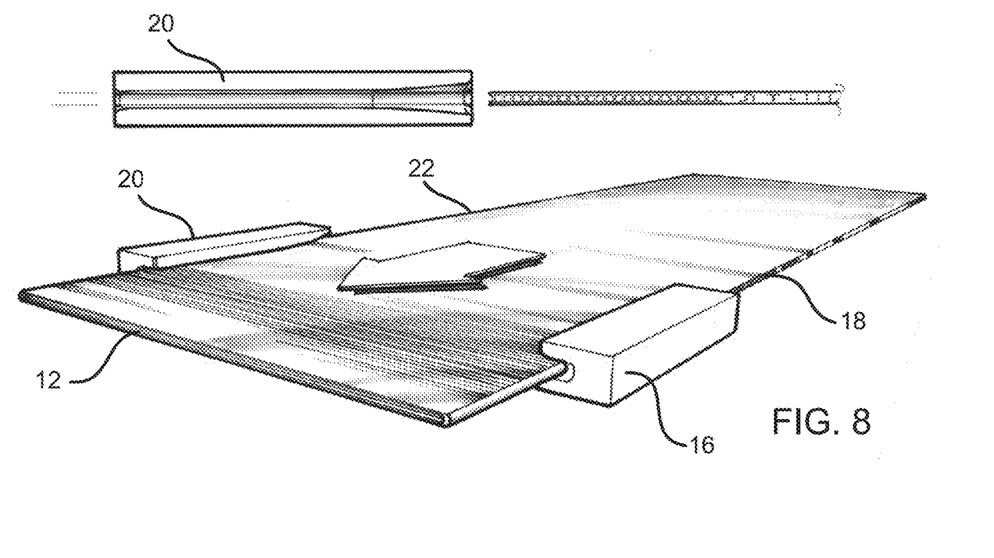
FIG. 8 is a perspective view of an edge sealing system and a partial side view of the system.

As discussed herein, both paper and plastic corrugated boxes have been mass produced at high speed using flatbed or rotary die cutters as shown in FIGS. 7 and 8, respectively. In each instance, all (or most) of the features needed in the blanks is formed in a single pass by each cutter. While this works well for paper corrugated material, it can cause issues with plastic corrugated material, leaving such plastic blanks less desirable or un-useable.

Plastic corrugated material is typically extruded to include a first outer layer, a second outer layer, and a plurality of internal parallel flutes or ribs connecting the first outer layer to the second outer layer. Forming features in such material can be problematic because plastic has an inherent memory. That is, over time (in some cases immediately or in merely minutes) the plastic partially or completely returns to its pre-formed shape. Accordingly, scoring or fold lines, or other features tend to disappear if formed simply by compression.

One method for overcoming the tendency of the plastic to return to its original state, is to utilize heat (or heat plus pressure) when reforming the plastic. In particular, it is necessary in many instances to, in effect, weld the first outer layer of the corrugated material to the second outer layer when forming score or fold lines, or flattening portions of the material.

This "welding" of the plastic can be accomplished by heating elements of the die cutter. However, it is challenging and perhaps impossible to keep a full size plate of steel (i.e., as used in a conventional die cutter) perfectly flat when heated. This inability will affect the blanks produced. Moreover, the speed such conventional die cutting machinery uses is not conducive to forming good welds in the plastic.

The present invention provides an in-line process which utilizes a slower speed and modifies the blanks in smaller increments or portions (i.e., as opposed to a single pass by a conventional die cutter). It is much easier to keep small cutting/sealing platens flat at elevated temperatures. Additionally, the slower speed of the in-line process allows more dwell time to seal edges and weld the plastic where necessary.

Figure 1:
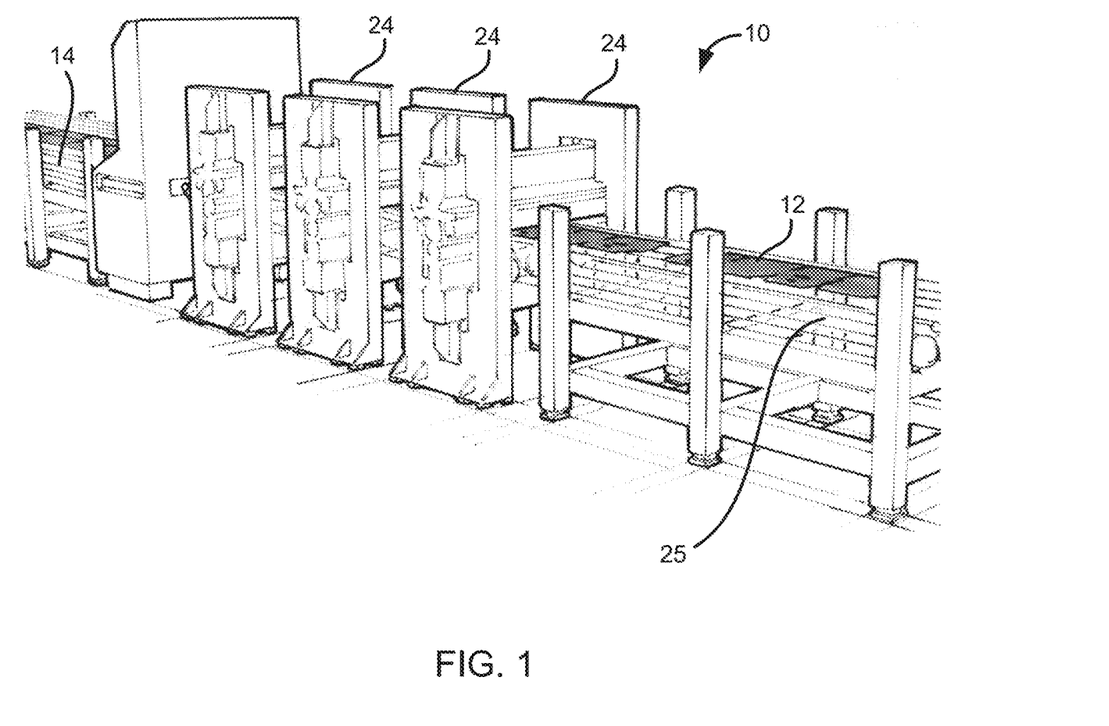
FIG. 1 is a perspective view of an in-line system for forming plastic corrugated blanks for forming boxes.

FIG. 1 illustrates an in-line processing system 10 for converting plastic corrugated material into blanks 12 for forming boxes. The system 10 removes individual blanks from a stack 14. The blanks 12 are singulated for transfer through a number of steps to impart features onto each blank 12 in a series of operations.

One optional first step, shown in FIG. 8, is sealing the edges of the plastic corrugated blank 12. Each blank 12 is drawn past a first die 16 that contacts a first edge 18 of the blank 12, and a second die 20 that contacts the second edge 22 of the blank 12. The dies 16, 20 seal the edge and form a rounded, smooth edge surface. A typical edge sealer can form 325-400 blanks 12 per hour—this is much slower than traditional die cutting equipment.

The blank 12 can then be indexed on a continuous belt 25 through an in-line series of additional operations at separate stations 24 of the system 10 to form the typical features needed for the blank 12 to be converted into a box. These include: (1) die cutting of glue tab (i.e., formation of manufacturer's joint connecting one end of the blank to the other); (2) die cutting of slots between bottom and top flaps; (3) flap scores; and (4) body scores or fold lines). The in-line process can also be used to impart other cuts and features to the blank, such as print or labels, or latch and hook material (e.g., Velcro®). After one step is performed, the blanks 12 are then transferred to the next station 24 for another operation.

Box flap and body scores can be imparted to the blank using several methods. These include using standard die rule to compress the material against a hard rigid plate (as is done with paper corrugated material). Using steel die rule or a steel bar to compress the plastic corrugated material against a heated steel plate to bond the upper and lower skins together. Using plunge type ultrasonic technology to impart the scores. Or using score rules to compress the plastic corrugated material against a steel plate. The plate could be heated to bond the upper and lower skins of the material for consistent score.

Figure 3:
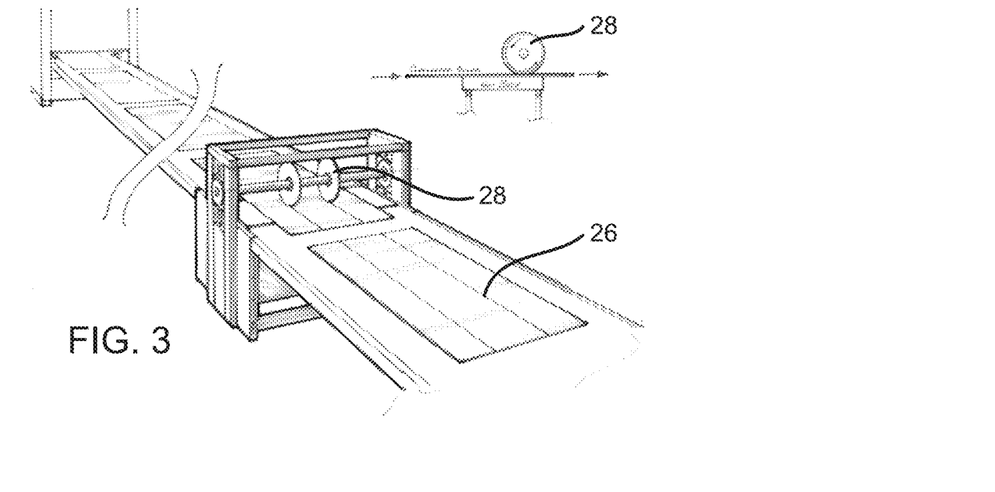
FIG. 3 is a perspective view of steel rollers forming score lines in plastic corrugated blanks in a step of an in-line system.
Figure 4:
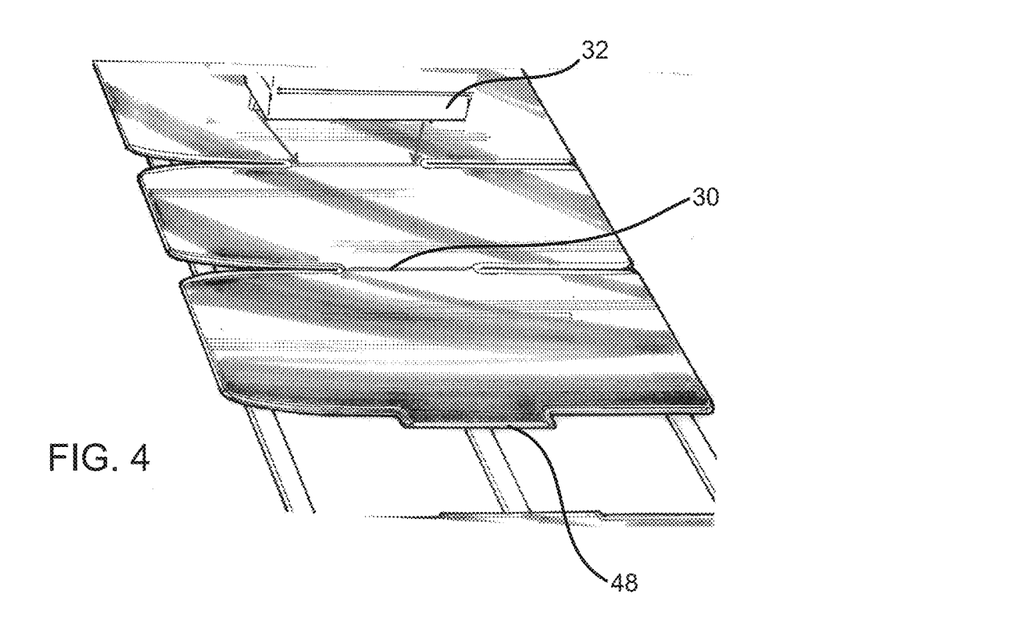
FIG. 4 is a partial perspective view of a steel scoring rule against a steel plate or "plunge" ultrasonic technology for folding body scores or fold lines.
Figure 5:
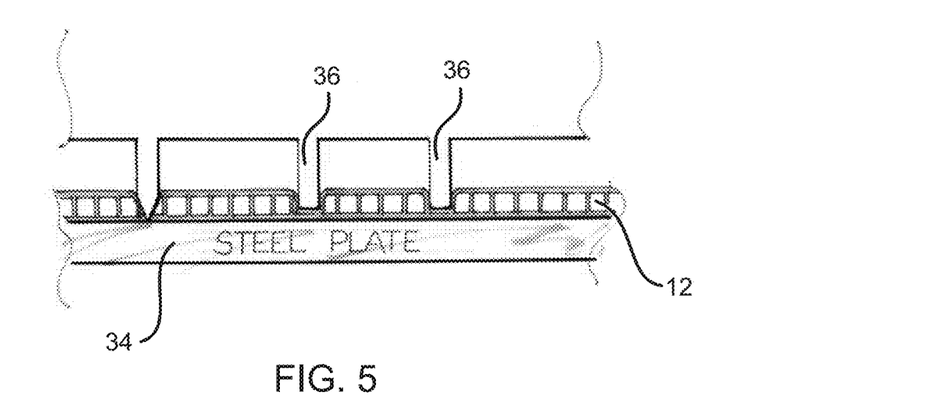
FIG. 5 is a partial side view of a heated steel plate and multiple scoring rules for forming score or fold lines in plastic corrugated blanks.

FIGS. 3-5 show components and process steps for forming flap and/or body scores. Flap scores 26 are shown being formed using steel rollers 28 in FIG. 3. The steel rollers 28 compress, or compress and bond the plastic material as the sheet moves through the process sequence. If bonding (i.e., welding of the top and bottom skin) is desired, it can be accomplished by compressing the material against a heated steel plate, or using rotary ultrasonic equipment.

Body scores 30 can also be imparted to the plastic corrugated blank using simple up and down compression of a steel scoring rule 32 against a steel plate as shown in FIG. 4. Alternatively, "plunge" ultrasonic technology can be used.

FIG. 5 also shows fold lines being formed in a blank 12. The blank 12 is on a heated steel plate 34. A plurality of scoring rules 36 compress the blank 12 against the steel plate 34.

By using a heated steel cutting plate 34, it is possible to bond the two outer skins of the plastic corrugated material together to form a clear fold line 30. When scored in this way the blank 12 will fold in the intended location and follow the imparted score line 30 rather than following the path of least resistance and jump to the area between the flutes adjacent to imparted score and the intended fold line 30.

Figure 6:
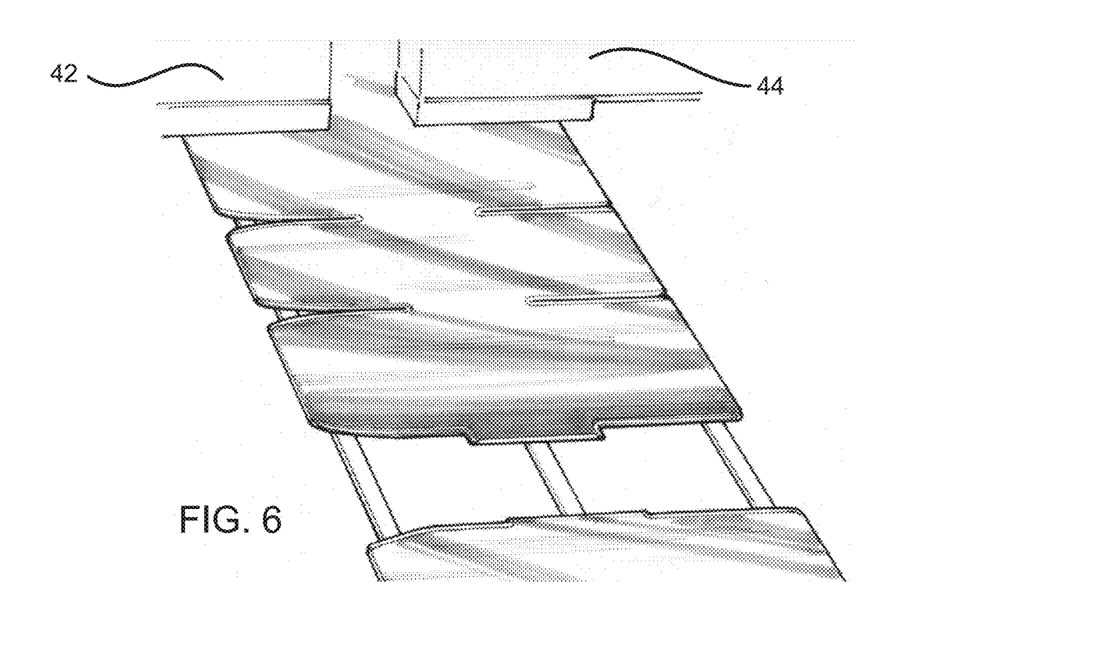
FIG. 6 is an upper partial perspective view of an upper rule to flatten portions of a plastic corrugated blank and forming flap slots.

A separate station 24 can be used to form and seal slots 38 between flaps 40 of the blank 12. As illustrated in FIGS. 6 and 7, a first die 42 and a second die 44 are each arranged to cut a slot 38 between adjacent flaps 40, and to seal the edges 46 of the slot 38. As blanks 12 are transferred and indexed through the sequential process steps, the flap slots 38 can be cut and sealed by a simple vertical press with mirror image cutting and sealing features on opposing sides of the transfer line. By using plunge ultrasonic technology or using steel rule to compress the plastic corrugated material to a heat steel plate 34 a quality cut and edge seal of slots 38 can be achieved.

Figure 2:
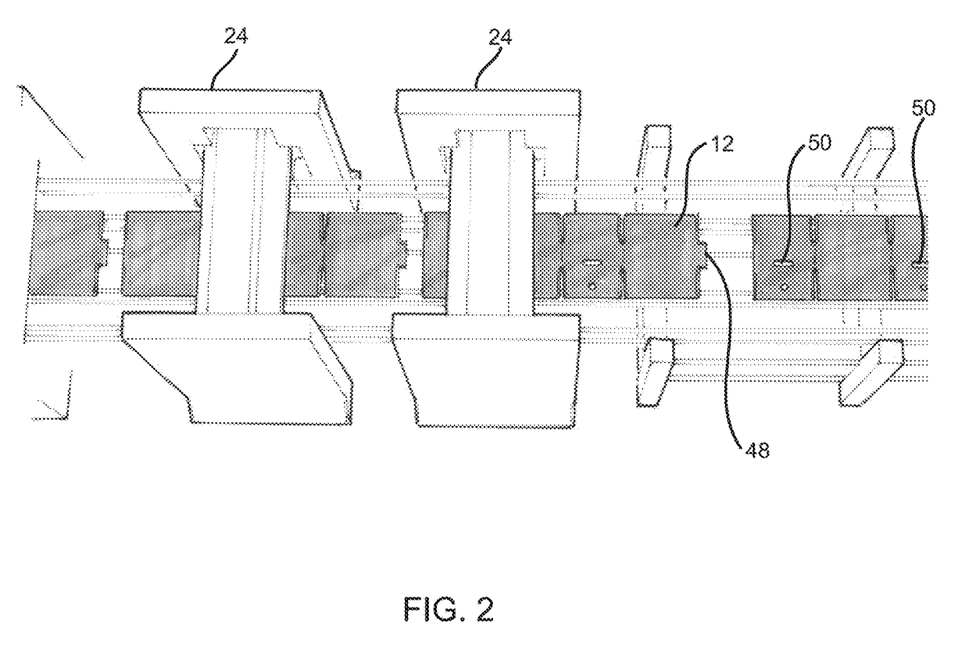
FIG. 2 is a top perspective view of an in-line system for forming plastic corrugated blanks for forming boxes.

Other stations—using similar dies, can be used to form other features, such as the glue joint 48 (i.e., manufacturer's joint). The glue joint 48 is shown, for example, in FIGS. 2 and 4. Additionally, such stations can cut out portions of the blank 12, such as hand holds 50 as shown in FIG. 2.

The in-line balanced process is designed for slower speeds (e.g., formation of 325-450 blanks 12 per hour). At such speeds, there is more dwell time for the heated steel plate to transfer enough heat to the blank 12 to get a good bond between the outer skins or layers of the material. At the 500+ per hour rate of conventional converting equipment there simply isn't enough dwell time to get consistent quality bonded score lines.

The process of indexing blanks in an in-line series of operations has the added benefit of imparting features on smaller areas of the blank 12 in any single operational step. This allows doing things that are very challenging to do when doing all of the cutting and scoring in a single stroke as typically done in the converting of paper corrugated boxes.

The balanced in-line process indexes the sheet through a series of operations. Only the area for each individual step needs to have the heated cutting area.

Figure 9:
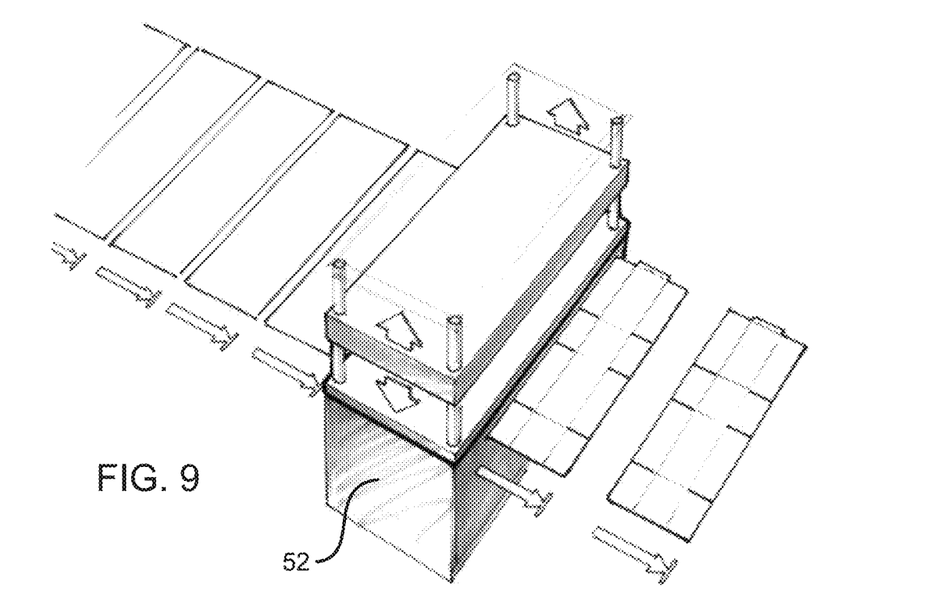
FIG. 9 is a perspective view of a prior flatbed die cutting system.
Figure 10:
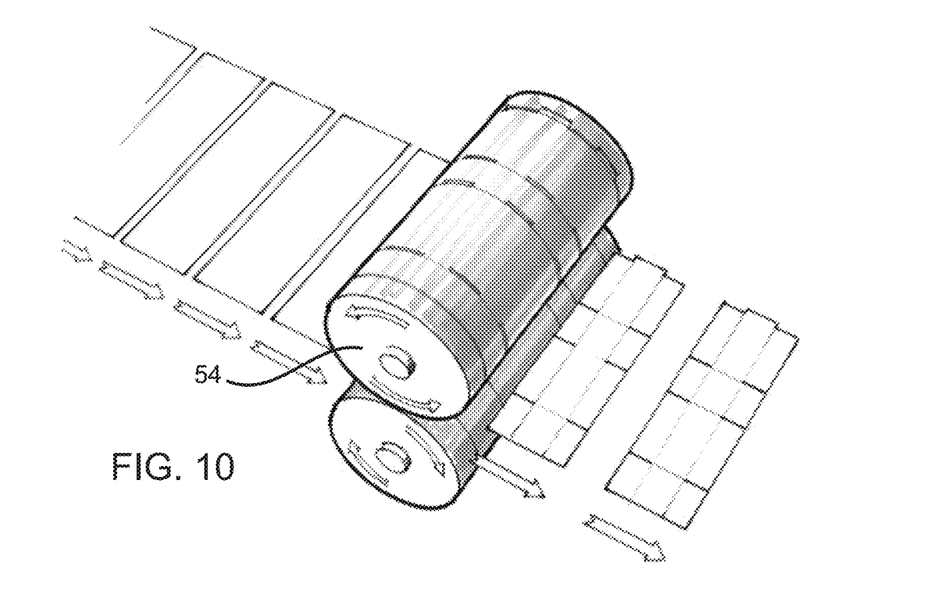
FIG. 10 is a perspective view a prior rotary die cutter.

Prior to the present invention, substantially all of the processing steps would have been done in a single pass of a die cutter, such as the flatbed die cutter 52 of FIG. 9 or the rotary die cutter 54 of FIG. 10. Because of the difficulty of heating the entire die cutter (which can distort the die), such prior processing did not result in consistently satisfactory blanks 12.

Instead of heating a large die cut plate (platen or striker plate) typical on a production flatbed die cutter 52, individual heated plates and vertical presses are used at the multiple stations 24. Such plates and presses are small when compared to the traditional flatbed die cutter 52. For boxes with 8 inch flaps, the heated cutting plate could be as small as 10 inches by 2 inches. For a box with 12 inch flaps the heated cutting plate could be as small as 14 inches by 2 inches. There is significantly less warp and distortion issues in heating a sequence of small plates as opposed to the large 82 inch×48 inch platen of a flatbed die cut machined designed for paper corrugated material.

The order in which sequence steps are conducted is not important in the in-line process. Moreover, the in-line process allows for modular sequential operational steps. That is, not all boxes will require all features and not all modules of the in-line process needs to be used in the production of every box.

Many modifications and variations of the present invention are possible in light of the above teachings. It is, therefore, to be understood within the scope of the appended claims the invention may be protected otherwise than as specifically described.

We claim:

1. A balanced in-line process for forming blanks for forming boxes comprising:
   extruding a blank of corrugated plastic material having a first outer layer, a second outer layer and a plurality of flutes extending between the first outer layer and the second outer layer;
   sequencing the blank through a plurality of forming stations;
   forming a first body fold line separating a first box side wall and a second box side wall in the blank at a first forming station; and,
   forming a score line to create a first flap in the blank at a second forming station wherein the first fold line is formed by the step of joining the first outer layer of the blank to the second outer layer of the blank at the first fold line.

2. The process of claim 1 further comprising the step of:
   forming a first slot between the first flap and a second flap in the blank at a third forming station.

3. The process of claim 2 further comprising the steps of:
   sealing edges of the first slot at the third forming station.

4. The process of claim 2 further comprising the step of:
   forming a glue tab at one end of the blank at a fourth forming station.

5. The process of claim 4 further comprising the step of:
   cutting a hand hold into the blank at a fifth forming station.

6. The process of claim 4 wherein the step of forming a glue tab at one end of the blank at a fourth forming station comprises:
   cutting the end of the blank to form a tab;
   joining the first outer layer of the tab to the second outer layer of the tab.

7. The process of claim 6 wherein the step of joining the first outer layer of the blank to the second outer layer of the blank at the first fold line comprises:
   contacting the blank with a die rule and a heated plate to weld the first outer layer to the second outer layer at the first fold line.

8. The process of claim 6 wherein the step of joining the first outer layer of the blank to the second outer layer of the blank at the first fold line comprises:
   contacting the blank with an ultrasonic emitter.

9. The process of claim 8 wherein the ultrasonic emitter is part of a plunge ultrasonic system.

10. The process of claim 8 wherein the ultrasonic emitter is part of a rotary ultrasonic system.

11. The process of claim 1 wherein the step of joining the first outer layer of the blank to the second outer layer of the blank at the first fold line comprises:
    contacting the blank with an impulse welding device.

12. The process of claim 1 further comprising the step of:
    forming smooth sealed edges on the blank at a third forming station.

13. The process of claim 1 further comprising the step of:
    adding latch and hook material to a portion of the blank at a third forming station.

14. The process of claim 1 further comprising the step of:
    printing a surface of the blank at a third forming station.

15. The process of claim 1 wherein the blanks are processed at a speed of approximately 325-450 blanks per hour.

* * * * *